Aug. 11, 1959 — E. C. BROWN ET AL — 2,899,006
SLOW-FAST POWER STEERING SYSTEM
Filed Aug. 16, 1957 — 3 Sheets-Sheet 1

INVENTORS
EDWIN C. BROWN
CARL W. GADEN
by: Carlson, Pitzner, Hubbard & Wolfe
ATTYS.

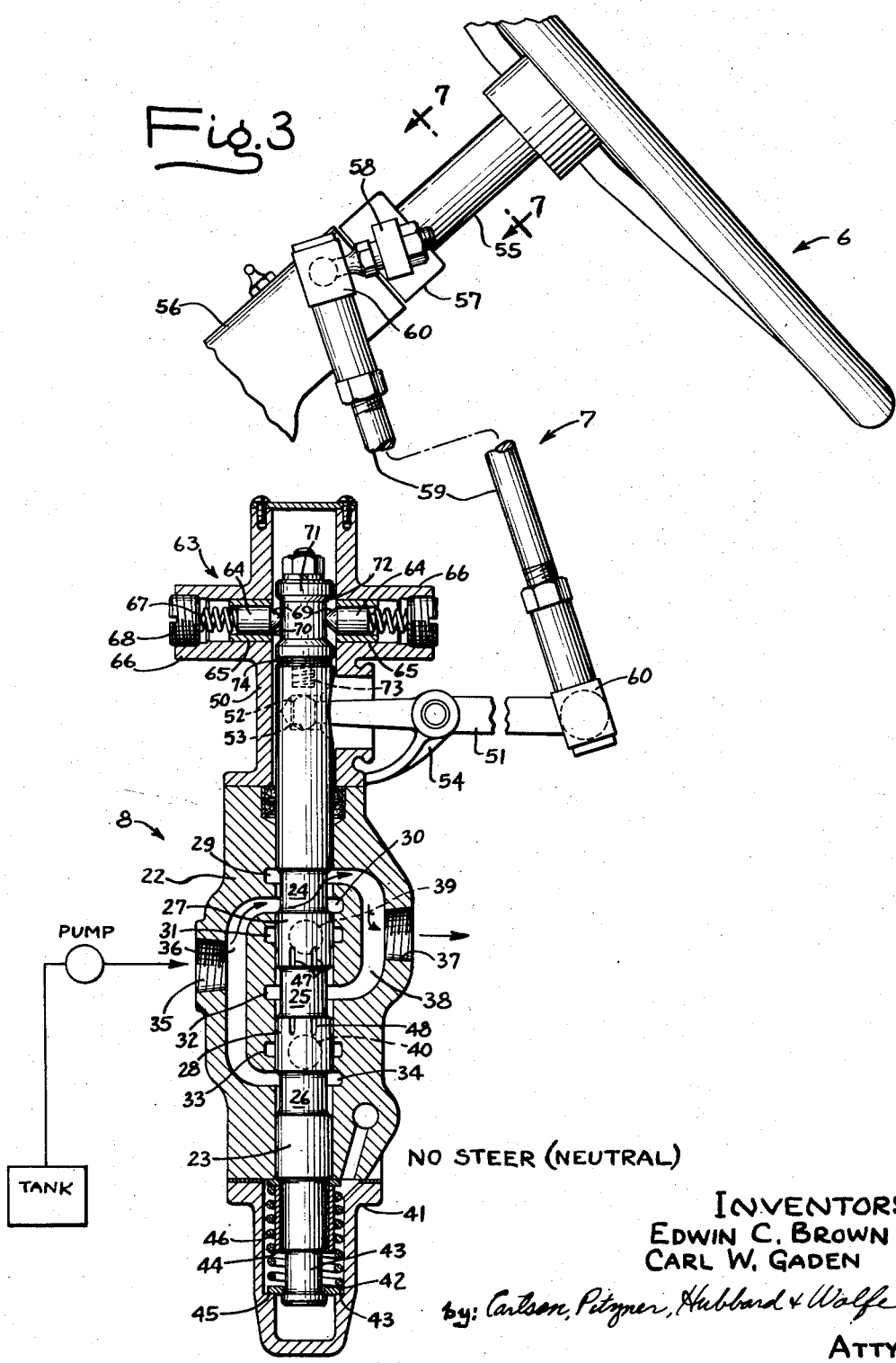

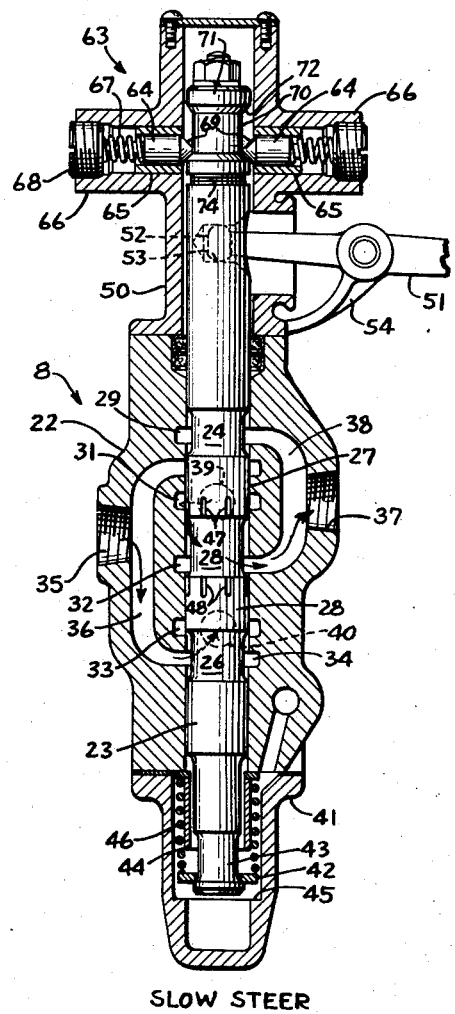
SLOW STEER
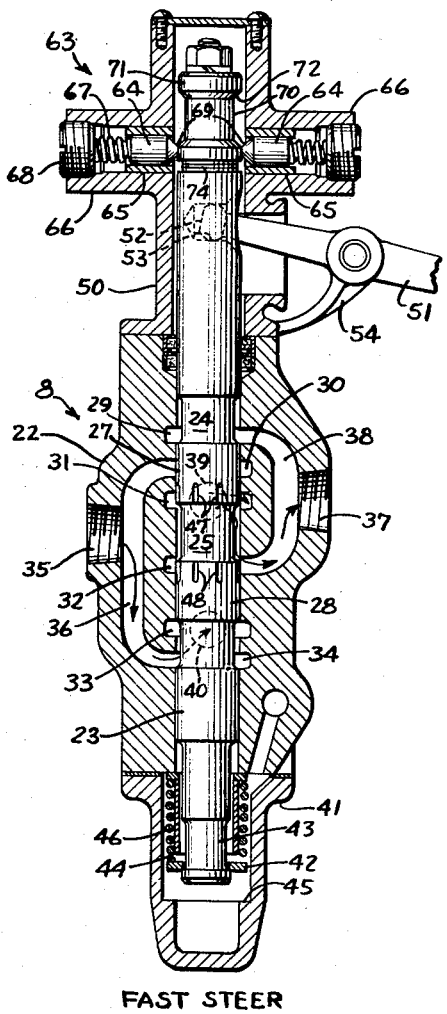
FAST STEER
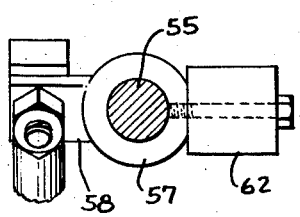
Fig. 7
INVENTORS
EDWIN C. BROWN
CARL W. GADEN
by: Carlsen, Pilzner, Hubbard & Wolfe
ATTYS.

United States Patent Office 2,899,006
Patented Aug. 11, 1959

2,899,006

SLOW-FAST POWER STEERING SYSTEM

Edwin C. Brown and Carl W. Gaden, Aurora, Ill., assignors to Baldwin-Lima-Hamilton Corporation, Philadelphia, Pa., a corporation of Pennsylvania Application August 16, 1957, Serial No. 678,620

5 Claims. (Cl. 180—79.2)

This invention relates to a vehicle power steering system.

In self-propelled vehicles such as road graders, the steered wheels are desirably turned at a fast rate when the vehicle is stopped or moving at its normally very slow working speed. Oil hydraulic power has been effectively used to relieve the vehicle operator of part or all of the heavy hand-steering burden. The power-steered systems have been of two types—(a) the power booster or servo type and (b) straight power steering actuated by a hydraulic cylinder and valve system without a follow up means. In the latter type, however, the steering rate provided by the hydraulic control system for fast steering at slow vehicle speeds is often too fast and dangerous for higher travelling speeds, as when the vehicle is being driven to or from a work site. This is the problem to which our invention is addressed, and it is our primary object to provide an improved power steering system for selective slow or fast steering rate operation for vehicles not equipped with power booster or servo systems.

The expense of apparatus for coordinating the hydraulic power steering with manual steering can therefore be avoided, for the mechanical steering system is itself safely eliminated. Accordingly, an important further object of my invention is that the steering system is simple, direct, and relatively inexpensive.

It is a further object to permit a substantial cost savings in the manufacture of the steering control combination by use of standard components to a large extent, as well as by simplification.

While present highly-developed directional control valves are desirably used in efficient power steering systems, a conventional steering wheel rather than a linear-stroke valve lever control is preferred by vehicle operators, particularly for steering at high road speeds. Dependable valves of generally preferred types readily available for two-way steering duty call for valve spool or plunger movement through a region of no-steer in changing the direction of turning of the steered wheels. Since attempts to utilize such valves for slow steering rates have required exact knowledge by the operator of the position of the valve spool the danger of over-steering at high road speeds may be readily apprehended.

Accordingly, it is a further object of my invention to provide in a power steering system an inexpensive steering wheel control for selective slow and fast steering rates. It is also an object to permit power steering at high vehicle road speeds in which the operator can dependably anticipate and avoid an undesired fast-steering speed valve position.

Briefly, in accordance with one aspect of my invention, a steering wheel is coupled through a direct linkage to the actuating spool of a directional control valve for selectively supplying high pressure hydraulic fluid to either the right-turning or left-turning actuator means of a road vehicle. Detent means on an extension of the valve spool require increased pressure on the steering wheel to move the spool beyond the detents. The detents are in turn aligned at the threshold of the fast-steer positions of the valve spool just before the hydraulic fluid is directed at its usual fast or full rate for either left or right steering. For fast turns, which are normally safe only when the vehicle is stopped or travelling at a very low speed, the operator turns the wheel to overcome the sensed detent pressure. This in no way hinders the flexiblity of the steering system nor curtails the normal fast steering operations at the usual slow vehicle speeds.

Other features, objects and advantages of the invention will become apparent from the following detailed description taken in connection with the accompanying drawings in which, Figure 1 is a side elevation of a road grader incorporating the invention;

Fig. 3 is a view of the steering mechanism including a cross sectional view of the directional control valve of the apparatus of Figs. 1 and 2, the valve being shown with the valve spool in its center or neutral position;

Fig. 4 is another cross sectional view of the directional control valve of Fig. 3 and part of the steering mechanism positioned for slow steering;

Fig. 5 is a view like Fig. 4 but positioned for fast steering;

Fig. 7 is a view along line 7—7 in Fig. 3 illustrating the valve linkage counterbalance weight.

Figure 1:
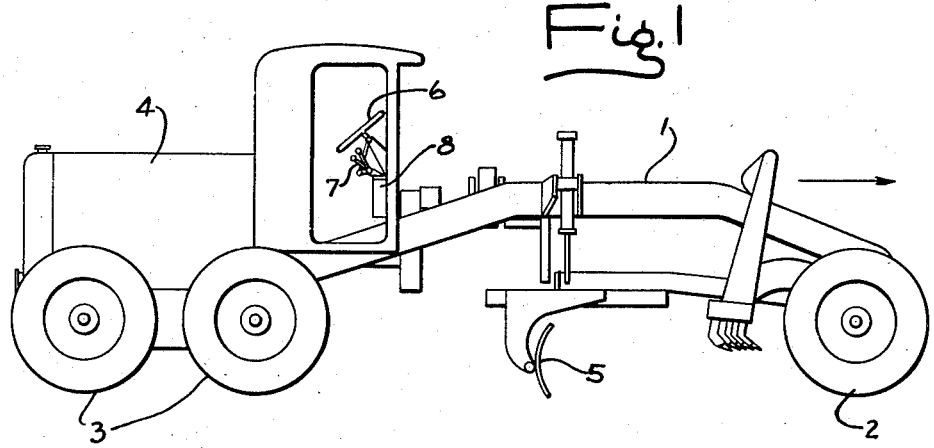

While the present invention is susceptible of various modifications and alternative constructions, an illustrative embodiment of the invention has been shown in the drawings and will be described below in considerable detail. It should be understood, however, that there is no intention to limit the invention to the specific forms disclosed but, on the contrary, the intention is to cover all modifications, alternative constructions, and equivalents falling within the spirit and scope of the invention as expressed in the appended claims.

Referring now to Fig. 1, a road grader incorporating the steering mechanism of our invention is illustrated as a vehicle in which our invention is very advantageously incorporated. As shown, the grader has a Y frame 1 on front wheels 2 and rear wheels 3, with power transmitted to the respective axles from a diesel engine 4. A blade 5 is positioned by hydraulic rams actuated by high pressure oil supplied by a pump coupled to the engine. For such heavy equipment having heavy steering loads and incorporating hydraulic controls for other work functions, hydraulic power steering of some form is a practical necessity. As shown in Fig. 1, a steering wheel 6 is located in the operator's cab. No steering shaft connection to the steered front wheels is shown because none is employed. Instead, a linkage 7 transmits the movement of the wheel to a hydraulic directional control valve 8 secured in the cab near the steering wheel.

Figure 2:
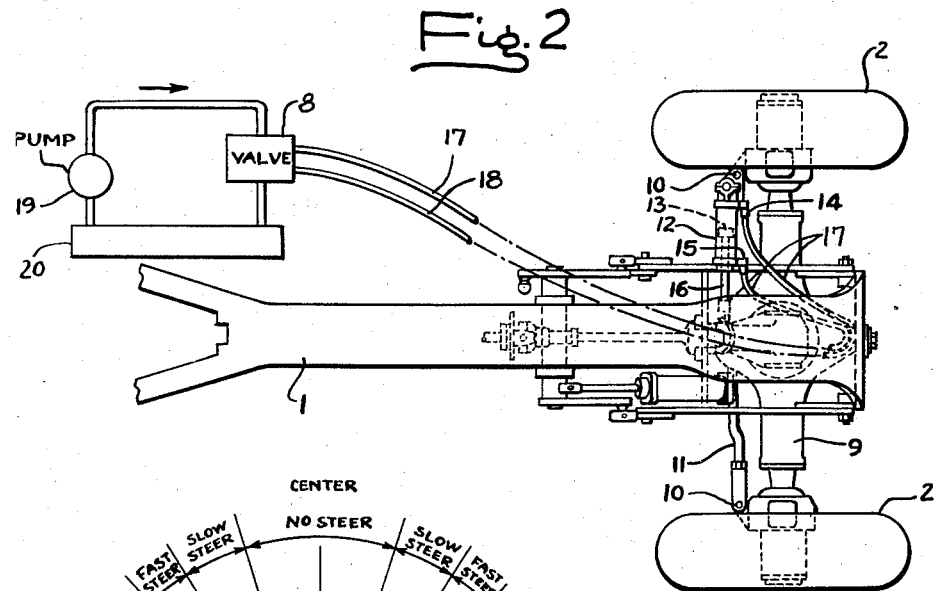
Figure 2 is a simplified view of the steering wheels and hydraulic actuator together with a schematic representation of the hydraulic circuit involved.

The hydraulic steering actuator and the manner in which it is suitably connected to a front wheel steering linkage is generally shown in Fig. 2. Thus the front wheels 2 to be steered are mounted on a conventional steerable front axle assembly 9 whose housing is suitably supported from the main frame 1. This front axle assembly is suitably a conventional type having knuckle couplings for power transmission to the steered wheels. Steering levers or arms 10 extend rearwardly from the axle ends and are pivotally coupled at their ends to the ends of a drag link or tie rod 11, thus forming a simple steering trapeze. The steering actuator is a two-way hydraulic ram or cylinder 12 of suitable size to provide ample power for steering the wheels. The cylinder suitably has a conventional piston 13 movable against the steering load by pressure of oil selectively supplied to ports 14 or 15 at opposite ends of the cylinder. To couple the ram to the steering trapeze, the piston rod 16 is pivotally connected, suitably by a ball joint, to the axle housing and the end of the cylinder housing is similarly coupled to the end of one of the steering levers 10.

The manner in which the steering actuator is coupled to the hydraulic circuit is also schematically indicated in Fig. 2. Hydraulic fluid flexible conduits 17 and 18 are connected between the respective ports 14 and 15 of the cylinder and the appropriate ports of the directional control valve 8. This control valve may be one of several in a valve bank since front wheel steering is often only one of the control functions involved, and the hydraulic circuit illustration is simplified for clarity of description. An oil pump 19 is connected from its suction side to a reservoir or tank 20, and supplies oil to the directional control valve 8 (and thence to the load represented by the steering ram). The load circuit between the valve and cylinder is closed, and exhaust oil is returned to the tank through the control valve. Such pumps and the associated hydraulic circuit elements are designed for high pressure operation, the pump relief usually being set at pressures of 1,000 pounds per square inch or more.

It may be readily appreciated that the vehicle is steered to the left or to the right by directing oil to a selected one of the cylinder ports to load the pump, while allowing return of the oil from the other cylinder port. The time required for the wheels to turn depends on the flow rate, the fast steering rate being the usual requirement when the grader is operating as such.

The directional control valve 8 selectively directs oil or other hydraulic fluid under load pressure to one port of the double-acting cylinder 12 and opens a return path to the tank for oil from the other cylinder port. Such a valve, as shown in Fig. 3, comprises a main housing 22 having a bore which provides a sliding fit for a spool 23 which is selectively displaced by the vehicle operator to change the direction of oil flow. The spool (sometimes called a stem, piston, or plunger) has cut-away portions or grooves defining a series of pistons or lands between them which cooperate with angular recesses or grooves in the bore of the housing communicating in turn with the external valve ports. Here the valve spool 23 has three grooved portions 24, 25 and 26 (reading downwardly in Fig. 3) defining between them intermediate lands 27 and 28. In the valve housing bore are vertically spaced annular recesses 29 (exhaust), 30 (inlet), 31 (cylinder port), 32 (exhaust), 33 (cylinder port), and 34 (inlet). It may be noted in passing that the valve construction is a type well known in the art for providing directional control with the valve spool in a balance position at all times. The type shown also has a center by-pass arrangement which unloads the pump and blocks the cylinder ports when the valve is in the center position.

Referring now briefly to the design and function of the valve for a better understanding of the novel steering system in which it is employed and of the coaction of the steering system elements, the valve has an inlet port 35 for the pumped oil (whether received directly from the pump or through another valve in a bank with the steering valve 8 here described). The inlet port communicates through housing passage 36 with housing recesses 30 and 34. An exhaust or tank port 37 communicates through passage 38 with housing recesses 29 and 32. With the valve in its center or neutral position inlet oil flows unimpeded through passage 36 past the spool groove 24 and out through passage 38 to the exhaust port 37. Upper and lower cylinder ports 39 and 40 (indicated in dotted outline in Fig. 3) of the valve housing are blocked by the respective lands or pistons 27 and 28 in this center by-pass position so that oil may neither flow to nor return from the cylinder. This locks the cylinder load and thus the steered wheels in the position selected by the duration of the steering movement.

The valve spool 23 is conventionally movable between positive upper and lower limits, such stop means being suitably incorporated in a housing cap 41 secured to the lower end of the main valve housing 22. As shown, a washer 42 rides a reduced-diameter portion 43 of the lower end of the spool between respective upper and lower abutments 44 (as a sleeve on the spool) and 45 (as a cap shoulder) in the cap 41. A helical compression spring 46 positioned around the lower spool end returns the spool to the neutral position when it is not held by the operator in a displaced position. A heavy centering spring is preferably employed to insure prompt center return of the spool (and the associated linkage employed in accordance with our invention) upon release. No sacrifice of the evenly graded spool or plunger operating pressure is involved, and no redesign of the commercially available typical valve structure thus far described is required.

Figs. 4 and 5 illustrate the operation of the valve 8 to provide slow and full oil flow as respectively required for slow and fast steering. Both show the valve spool 23 displaced upwardly from the neutral position; it will be readily understood that corresponding downward displacements are available for steering, fast or slow, in the reverse direction. While such valves are essentially directional controls, some flow control is feasible by metering the oil flow through an orifice which is small compared to the full open condition of the cylinder port passages. This effect is limited to flow below what may be termed for reference here the "full or fast flow threshold." I refer to the condition when the port passages are just slightly uncovered (i.e., the valve is "cracked") so that the small valve orifice plays a major role in loading the pump. Since the range of spool movement is very small in which such a usefully restricted flow can be maintained, the spool displacement between full-flow, no-flow and the threshold can be better predetermined and controlled by such means as the metering slots 47 and 48 shown on the valve spool lands 27 and 28. These axial multiple slots 47 and 48 are suitably formed by milling the respective facing or discharge end portions of the lands 27 and 28. The slots are spaced about the land circumference to maintain pressure balance and define in each land for a short distance a small orifice cross section area. This permits slow flow control through a predetermined displacement of the valve spool before the unslotted edge portions of the lands uncover the annular housing recesses 31 or 32 associated respectively with the cylinder ports 39 or 40. Whether or not such metering slots 47 and 48 are employed, the extent of valve spool displacement in the useful slow-flow region remains relatively small, since the usual overall considerations dictate a short overall total spool stroke or displacement.

A brief reference to the valve operation as such should be sufficient to explain the oil flow paths during the slow and fast flow valve position graphically demonstrated in Figs. 4 and 5 without detailing the relative dimensions of the valve passages. Thus with the valve spool partially displaced from center as in Fig. 4, oil from the pump enters the inlet port 35 and passage 36 but is blocked by the land 27 from flowing to the tank. Instead the oil in passage 36 is admitted to the housing recess 34 and along the spool groove 26 to the uncovered annular housing recess 33, lower cylinder port 40, and thence to one side of the steering ram piston 13. The oil on the other side of the piston 13 must return to the tank if the ram is to operate against the steering load. Accordingly, in the same spool position of Fig. 4, the return or exhaust oil entering the upper cylinder port 39 and annular recess 31 flows through the metering slots 47 past the spool groove 25 to the housing exhaust recess 32, exhaust passage 38, and exhaust port 37. The slow steering rate is suitably provided by restricting the flow of return oil to that which can be passed by the metering slots 47. Except for the slots 47 the load 27 would completely block the passage of oil from the cylinder port 37 in the Fig. 4 spool position.

When, as in Fig. 5, the valve spool is further displaced, at or near its limit position, the upper cylinder port 39 and recess 31 as well as the lower cylinder port 40 and recess 33 are uncovered for fast flow. The loading of the pump then becomes substantially the steering load imposed upon the ram. The oil paths are the same as in Fig. 4 except that the return oil entering the upper cylinder port recess 31 is not restricted to the metering orifice presented by the small slots 47 in flowing past the spool groove 25 to the exhaust passage.

The same valve spool when moved downwardly from the central position directs inlet oil from the pump to the upper cylinder port 39 and returning oil from the lower cylinder port 40 must flow through the lower metering grooves 48 to the exhaust passage when the spool is displaced to the slow steer position. At lower spool positions the lower cylinder port recess 33 is sufficiently uncovered by land 28 for fast flow of the return oil.

The particular arrangement here of valve lands and recesses is designed to perform the functions in a suitable manner and without calling for unusual dexterity or skill in operation of the valve. It will be appreciated that other particular valve arrangements may be employed without departing from the spirit and scope of the invention in its broader aspects for control of a two-way hydraulic motor by the stroke of a directional valve spool. For example, the metering orifices shown here as slots 47 and 48 restricting the flow of oil in the return path of the closed motor circuit, may alternatively be located in the path of the oil being directed to the motor or in both paths.

In accordance with our invention, the valve spool 23 is linearly displaced by a steering wheel 6 through a reversible linkage assembly 7 as further shown in Fig. 3. Toward this end, the upper end of the spool 23 extends beyond the main housing 22 within an auxiliary housing 50. An operating lever 51 for setting the stroke of the plunger has a ball end 52 seated in a machined and hardened bore 53 in the upper extending portion of the spool 23. A bracket 54, preferably integral with the valve housing 22 pivotally supports the operating lever 51 intermediate of its ends so that vertical displacement of the outer end of the lever establishes the valve spool position.

The steering wheel 6 is itself mounted on a stub shaft 55 seated in a bracket 56 stationed in the grader cab above the valve. The angular displacement of the steered wheel is transmitted by a shaft collar 57 having a crank or arm portion 58 extending laterally from it. The end of the crank and the end of the valve operating lever are coupled by a link 59. Ball sockets 60 at the end of the link respectively engage ball ends 61 of the crank and lever to provide a freely pivotable linkage. The link 59 is preferably adjustable in length by virtue of its threaded coupling with the ball socket portions.

Release of the steering wheel 6 accordingly permits the valve centering spring 46 to center the plunger and return the steering wheel to its center position by displacing the ball end 52 of the operating lever. The linkage is also preferably counterbalanced to facilitate the valve centering action. A simple means, as shown in Fig. 7, is provided by a weight 63 secured to the steering shaft collar 57 on the opposite side from the crank 58.

In further accordance with our invention, a detent assembly 63 defines an operating resistance to be overcome when the valve spool is moved beyond the fast flow threshold. This detent means is housed in the auxiliary valve housing 50 illustrated in Fig. 3. Detent plungers 64 are alined to engage diametrically opposite sides of the spool and slide in bushings 65 located in a cross-bore in the auxiliary housing. Integral with the auxiliary housing 50 are detent housing portions 66 which also accommodate plunger loading springs 67 and retaining screws 68. As shown, the detents 64 have chamfered or beveled portions 69 at their inner ends so that they may retreat against the loading spring pressure when engaged by a spool abutment.

The cooperating valve spool detent elements are simply provided by machining a groove 70 of predetermined width in the end of a valve spool extension 71. The detents ride the groove without any appreciable loading or friction until the spool displacement causes the groove shoulders to engage the detents. Further movement of the valve spool requires appreciable or palpable steering pressure or torque to cause the detents to retreat after which the detents ride freely on a full diameter portion of the spool extension (Fig. 5). The detent groove shoulders 72, which thus operate as cam surfaces, are preferably angular or oblique to match the detent plunger bevel 69 and assure an exact engagement position free of binding.

Because the valve spool extension 71 is directly secured to the valve spool 23 without intervening linkage, the detent shoulders 72 are readily located and precisely maintained to engage the detent plungers 64 at the fast flow threshold in either direction of spool displacement from the center position of Fig. 3. For ease in manufacturing, and to minimize valve design changes, the spool extension 71 is preferably a separate element having a threaded stud 73 (shown in Fig. 3) screwed into the upper end of the spool 23. Shims 74 are selected to aline the groove shoulders 72 with the fast-flow threshold locations of a given valve plunger.

The detent assembly 63 in the auxiliary housing 50 thus converts a valve of the general type described into a useful part of the steering system of our invention.

Figure 6:
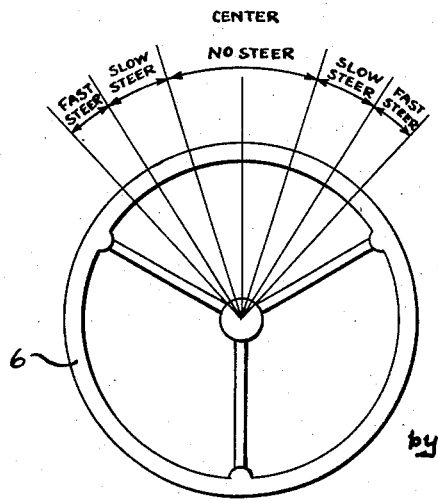
Fig. 6 is a plan view of the steering wheel itself showing the position limits between the fast-steer and the slow-steer rates which are incorporated in the steering system in accordance with the invention.

Referring now to Fig. 6, the operation of the steering system may be further seen together with the safety features and steering flexibility available to the operator. Thus, Fig. 6 shows the steering wheel at its center position to which it is returned by the valve centering spring 46 whenever the wheel is released. With the wheel in this position, the steered wheels are not being turned, but are locked in their previously directed position. Of course, with the power-operated steering not employing a follow-up means, the position of the steered wheels is not indicated by the steering wheel position. In order to change the steered wheel position, the operator normally turns the steering wheel to the left or right and holds the wheel at or near its limit position (Fig. 5 shows the valve near a limit position) until the steered wheels have attained the desired angular displacement. No problem in steering the wheels at the fast rate appears, the operator merely giving the wheel full play. Moreover, steering at less than the full or fast flow position of the valve spool in either direction is simplified, even though the steering wheel must be moved past the substantial no-steer region of the valve spool, and over-steering is easily avoided at high vehicle speeds. In practice the operator merely swings the wheel from the slow-steering speed position in one direction through the no-steer angle and against the detent indicating the threshold of the fast steer speed in the other direction with complete confidence. The "lost motion" necessarily present as the no-steer angle in view of the typical valve construction thus need not impede fast, safe steering. No detent engagement is required for the neutral steering wheel position (Fig. 3) because of the valve spring centering action and the uncritically broad no-steer angle. At no time is the operator required to visually inspect the steering wheel or plunger.

It will further be appreciated that lost motion necessarily involved in a pivoted linkage system 7 such as that shown between the steering wheel and the valve spool cannot affect the threshold indication provided by the direct detent action on the valve spool itself. The linkage is readily adjusted during installation without altering the fast-flow threshold calibration established when the detent assembly is assembled on the valve.

We claim as our invention:

1. In combination, a steerable wheeled vehicle, a two-way hydraulic ram for changing the angular position of the wheels at a given full steering rate, a pump for delivering hydraulic fluid to the ram, a hydraulic directional control valve between the ram and pump for selecting the steering direction, said valve comprising a housing with pump, ram, and exhaust ports and a slidable spool in the housing, said spool being axially moveable in either direction from a no-steer center position through a slow steering rate position into a full steering rate position to selectively uncover the ram ports to said pump and exhaust ports, a rotatable steering shaft, a mechanical linkage between the steering shaft and the spool to displace the spool in general correspondence with the rotated position of the steering shaft, and means for sensing the limit of each of said slow steering rate positions of the valve spool upon rotation of the steering shaft comprising a yieldable detent member supported by said housing and spaced co-operating cam surfaces on the spool each alined for engagement with the detent member at one of said spool slow steering rate position limits.

2. In a steerable wheeled vehicle, a two-way hydraulic ram for changing the angular position of the wheels in accordance with the direction and rate of flow of high pressure oil, a hydraulic directional control valve comprising a housing and a slidable valve spool therein, said housing having oil inlet and exhaust ports selectively communicating with ram ports in accordance with the displacement of the slidable valve spool from a center position through a slow steering rate position to a full steering rate position in either direction, a rotatable steering shaft, a mechanical linkage between the steering shaft and the valve spool for progressively displacing the spool in accordance with the angular displacement of the steering shaft from its center position, and detent means supported by said housing and bearing on the valve spool, one end of said valve spool having spaced cam surfaces respectively alined to engage the detent means at the respective spool positions between the slow and full steering rate in either direction, said detent means being yieldable to require a palpable increase in steering pressure to turn the steering shaft beyond the engagement of the detent means with either of said cam surfaces in the direction of slow to full steering rate.

3. In a vehicle steering system having hydraulic motor means for steering the vehicle wheels, a directional control valve having a housing and a valve plunger slidable therein for operating said hydraulic motor means in a direction corresponding to the selected direction of displacement of the valve plunger from a no-steer center reference position and at a steering rate which is relatively slow for a small displacement range preceding the threshold position at which the full steering rate begins for either steering direction, a rotatable steering shaft, a reversible mechanical linkage between the steering shaft and the valve plunger connected to displace the plunger from its reference position as the steering shaft is rotated with respect to a center reference angular position, means for returning the plunger and the steering shaft to their respective center reference positions when the shaft is released, and means for sensing the limits of the slow steering rate displacement of the valve plunger comprising a yieldable resistance detent means interposed between respective adjacent end portions of said housing and said valve plunger, said detent means having a yieldable detent member supported by one of said end portions and a pair of spaced co-operating cam surfaces on the other of said end portions each alined for engagement with the detent member at one of said threshold positions.

4. In a steering system for a wheeled vehicle, a two-way hydraulic motor for changing the angular position of the wheels in accordance with the direction and rate of flow of high pressure oil, a hydraulic directional control valve housing having motor ports connected in circuit with said motor and having oil inlet and exhaust ports connected in circuit with an oil pump and exhaust tank, said housing ports separately communicating through housing passages with a central housing bore, a slidable valve spool in the housing bore having a series of spaced lands for uncovering the respective motor port passages to selectively connect them with the oil inlet and exhaust port passages for oil flow in a direction responsive to the direction of spool displacement beyond a center position and at a rate changing from zero flow at a center spool displacement range through a slow-steering rate displacement range to a fast-steering rate displacement range, said slow-rate displacement range being defined by the length of metering grooves in at least one of the spool lands, a steering wheel mechanically linked to the valve spool to displace the spool in response to the direction and extent of angular displacement of the steering wheel from its center position, and means for anticipating fast-steering rate position of the spool in either direction comprising an end housing for one end portion of said valve spool, a pair of spaced detent members in said end housing bearing against said end portion of said spool, said spool end portion having a recess with cam surfaces at each end of the recess each alined to engage one of said detent members at the spool position between the slow and fast steering rates in one flow direction, said detent members being yieldable to require a palpable increase in steering pressure to turn the wheel beyond the detent engagement in the direction of slow to full steering rate.

5. In a steering system for a wheeled vehicle, a two-way hydraulic motor for changing the angular position of the wheels in accordance with the direction and rate of flow of high pressure oil, a hydraulic directional control valve housing having motor ports connected in circuit with said motor and having oil inlet and exhaust ports connected in circuit with an oil pump and exhaust tank, said housing ports separately communicating through housing passages with a central housing bore, a slidable spool in the housing bore having a series of spaced lands for uncovering the respective motor port passages to selectively connect them with the oil inlet and exhaust port passages for motor oil flow in a direction responsive to the direction of spool displacement beyond a center position and at a rate changing from zero flow at a center spool displacement range through a slow-steering rate displacement range to a fast-steering rate displacement range, a steering wheel mechanically linked to the valve spool for displacement of the spool in response to the direction and extent of angular displacement of the steering wheel from its center position, and means for anticipating fast-steering rate position of the spool in either direction comprising a valve spool extension adjustably secured to one end of said spool, an auxiliary valve spool extension housing secured to said valve housing with spaced detent members therein bearing against said spool extension, said spool extension having a recessed portion with end stops respectively alined to the respective detent members at the spool position between the slow and fast steering rates in either flow direction, said detent members being yieldable to require a palpable increase in steering pressure to turn the wheel beyond the detent engagement in the direction of slow to full steering rate.

References Cited in the file of this patent

UNITED STATES PATENTS 2,532,552    Jirsa et al.    Dec. 5, 1950
2,796,851    Zirkal    June 25, 1957